July 5, 1949.　　　　C. C. POTTER　　　　2,475,515
INSECT EXCLUDING COMPARTMENT
Filed Jan. 7, 1946　　　　　　　　　　2 Sheets-Sheet 1
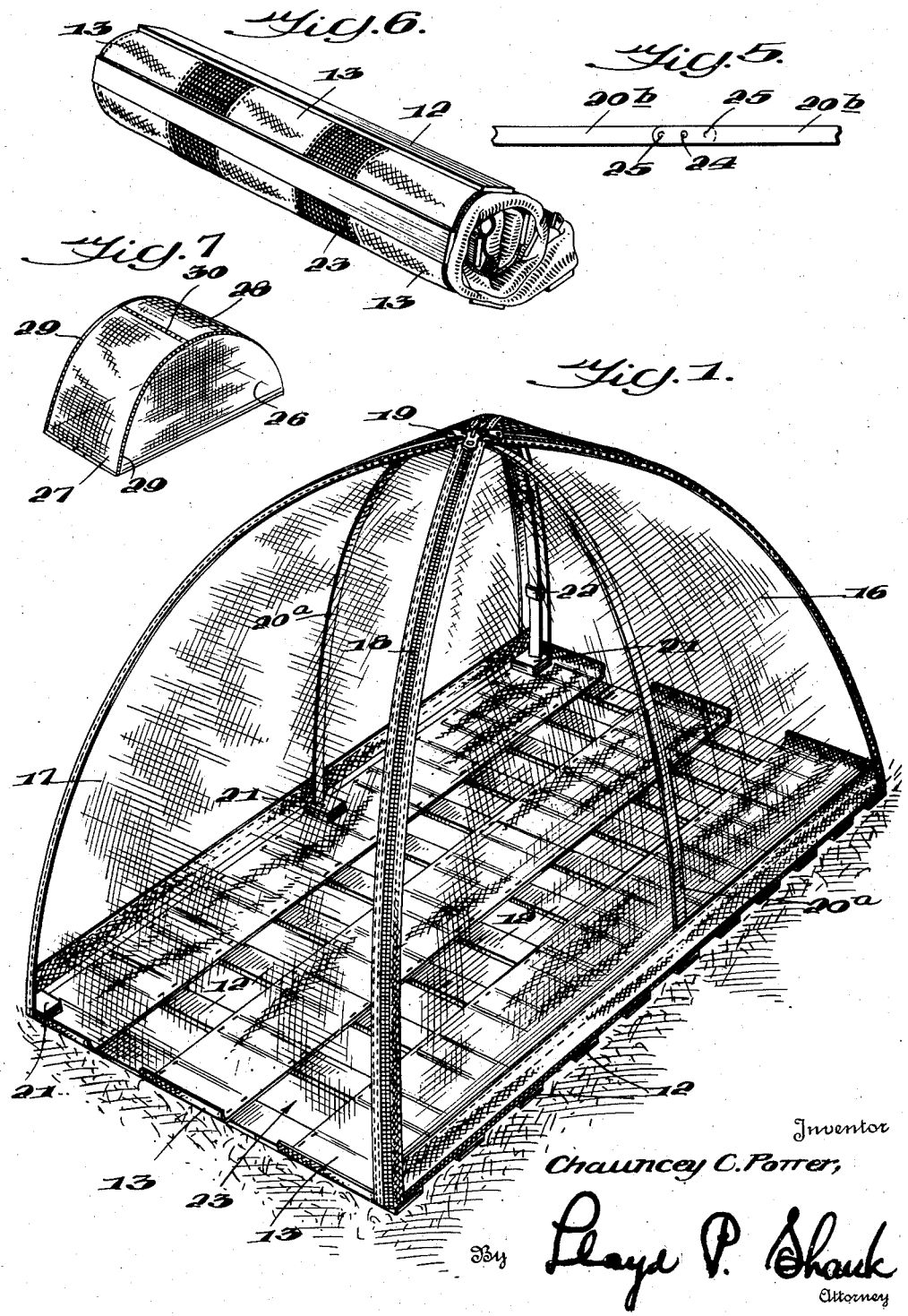

July 5, 1949.  C. C. POTTER  2,475,515
INSECT EXCLUDING COMPARTMENT
Filed Jan. 7, 1946  2 Sheets-Sheet 2
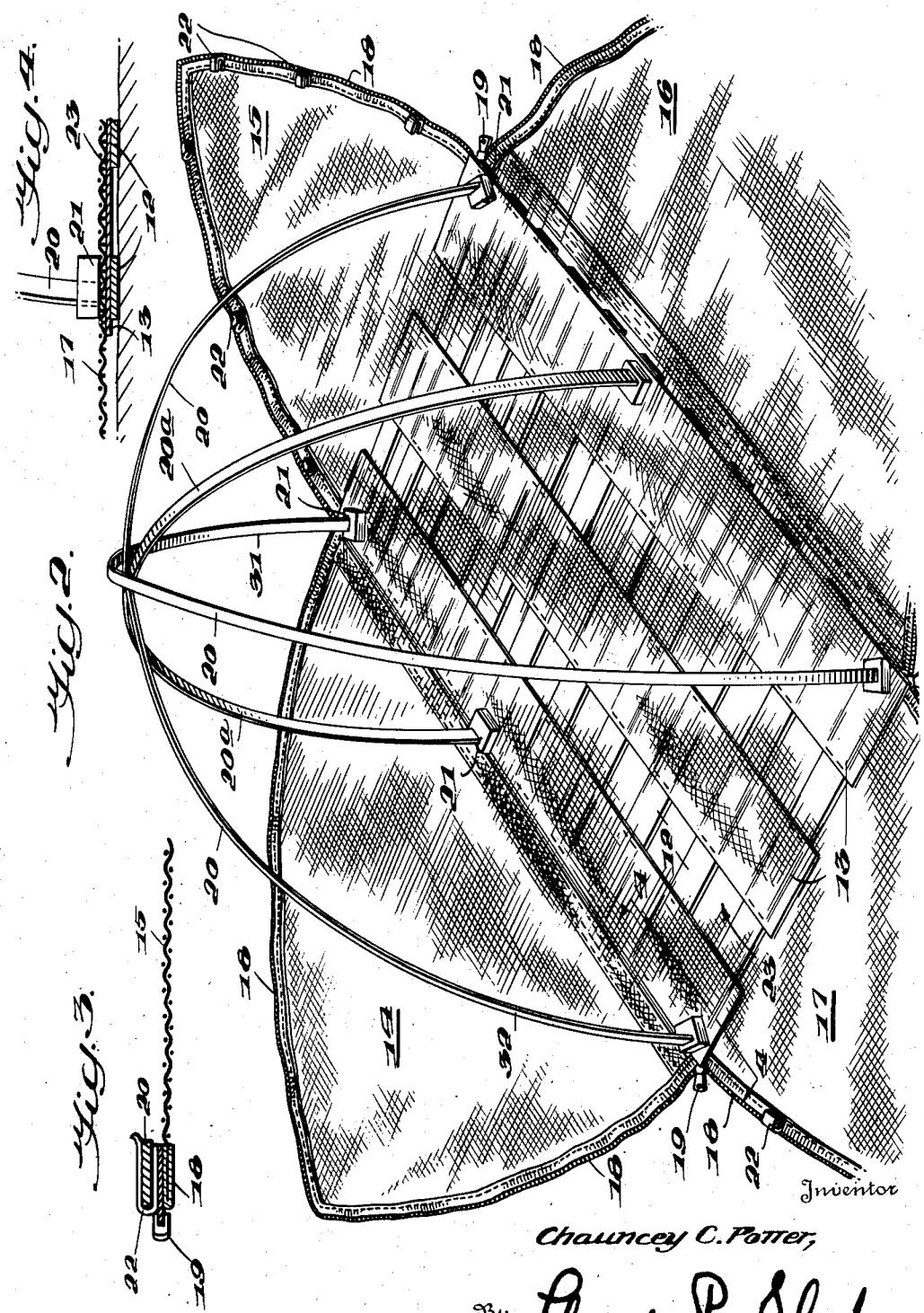
Inventor
Chauncey C. Potter,
By Lloyd P. Shank
Attorney Patented July 5, 1949

2,475,515

UNITED STATES PATENT OFFICE 2,475,515

INSECT EXCLUDING COMPARTMENT

Chauncey C. Potter, Washington, D. C.

Application January 7, 1946, Serial No. 639,595

10 Claims. (Cl. 135—1)

The present invention relates to a device for encasing an infant or an adult so as to exclude insects, reptiles, rodents and the like from the interior of the device and accordingly from the presence of the occupant of the compartment.

An object of the invention is to provide a device within which an infant or an invalid may obtain the beneficial rays of the sun and fresh air while being protected from ants, flies, mosquitoes and particularly disease-carrying insects and the enclosure further serves to prevent an infant from wandering from the safety of the protective compartment.

A more specific object of the invention is to provide an insect-excluding netting which is supported in a canopy-like fashion to provide a relatively large compartment which may be readily erected at any convenient place without the use of auxiliary elements such as stakes, ropes and the like and at the same time providing a relatively stable compartment that will not collapse upon the occupant.

A still further object of the invention is to provide an insect and rodent excluding compartment within which an adult may sleep out doors at night with safety and within which soldiers serving in the tropical areas are protected from disease-carrying flies and mosquitoes.

A further and more detailed object of the invention pertains to the shape of the flaps of the insect-excluding netting which extend from the sides and ends of the bottom screen and the flaps are detachably joined along the contiguous edges to provide an arched canopy including resilient arched supports which render the bottom relatively rigid and provides a structure which may be readily dismounted and the flaps folded over the bottom member and then be arranged in a compact roll for convenient storage and transportation.

Other objects and features of the invention will be apparent as the disclosure proceeds and upon consideration of the accompanying drawings and the following detailed description wherein several exemplary embodiments of the invention are disclosed.

In the drawings:

Fig. 1 is a perspective view of a protective compartment having perforate walls and embodying the invention.

Fig. 2 is a perspective view illustrating the flaps in open position and showing arched supports for the flaps.

Fig. 3 is a transverse sectional view of one of the arched supports illustrating the manner in which one of the hooks carried by a flap is associated therewith.

Fig. 4 is a sectional view of the bottom structure and a portion of an end flap taken on the line 4—4 of Fig. 2.

Fig. 5 is a fragmentary plan view of one of the arched supports showing a hinged joint therein.

Fig. 6 is a perspective view illustrating the manner in which the device may be folded and rolled into a compact form.

Fig. 7 is a perspective view illustrating a modification on a smaller scale.

A structure exhibiting the invention comprises a bottom member 23 which includes an insect-excluding netting such as an open mesh screen. The netting providing a part of the bottom member may be formed of wire screen or of synthetic material such as plastic screen and particularly a screen fabric woven from vinylidene chloride fiber and sold under the trade name of "Lumite." The screen or netting may be of any suitable mesh such as one formed of twenty weft and warp strands to the inch. The overall shape of the bottom member is generally rectangular and may be of any suitable dimensions depending upon the size of the occupant or occupants. If the device is intended to provide protection for an infant it may be made relatively smaller in both lateral and longitudinal dimensions, whereas if the compartment is to be used by an adult, it may have an appropriate length to provide for the unhampered relaxation therein.

The bottom member includes reinforcement for the screen which may be of any suitable character such as a plurality of longitudinally extending strips 13. The strips 13 may be formed of canvas or any suitable textile material so as to provide adequate strength for the bottom member. The bottom member preferably includes a plurality of slats or bars 12 arranged transversely of the device and at spaced intervals lengthwise of the bottom member as shown in Figs. 1 and 2. The slats 12 may be formed of wood and are preferably of such small size as to reduce the overall weight of the assembly. The screen forming the bottom closure is arranged over the reinforcing strips 13 and the screen and the strips 13 are tacked or otherwise secured to the slats. The screen and the reinforcing material may be stapled to the slats as shown in Fig. 1.

A structure embodying the invention includes end flaps 15 and 17 as shown in Fig. 2. The end flaps 15 and 17 are preferably formed integral with the screen or netting of the bottom member and these end flaps terminate in arcuate edges which converge towards each other as shown particularly by the end flap 15 in Fig. 2. The device includes side flaps 14 and 16 which are also preferably formed integral with the netting or screen of the bottom member. Thus in cutting the netting or screen the end flaps 15 and 17 and the side flaps 14 and 16 are shaped from the same piece of material as that of the bottom member.

The end and side flaps are adapted to form a closed canopy over the bottom member to form an insect, rodent and reptile excluding compartment and the device includes means for supporting the flaps to form such a canopy. In the embodiment illustrated in Figs. 1 and 2 a supporting member 20 extends upwardly from one corner of the bottom member 23 and arches to a diagonally opposite corner. Another arched member 20 extends from a third corner of the bottom member to an opposite diagonal corner as clearly illustrated in Fig. 2. These arched supports cross at a point above the approximate center of the bottom member. The arched members 20 may be formed of any resilient material such as spring steel and are illustrated in the exemplary embodiment as having a relatively flat cross section. The ends of the arched members 20 are seated in suitable socket members 21. The socket members may be formed with recesses to receive the end of the arched springs 20. The socket members 21 are secured to the slats 12 at the ends of the bottom member.

It will be observed from a consideration of Fig. 2 that the lateral edges of the end flaps 15 and 17 are arcuate and converge towards each other to form a substantially pointed end spaced from the associated end of the bottom member as clearly shown by the flap 15. The curvature of the marginal edges of the end flaps correspond substantially to the inward convergence of the arched supports 20 when these flaps lie therealong. The side flaps 14 and 16 also have arcuate shaped marginal edges which converge towards each other in proceeding outwardly from a side of the bottom member. The curvature of the edges of the side flaps as shown by the side flap 14 in Fig. 2 also corresponds to the curvature of the arched supports 20. Thus when the end flaps and the side flaps are arranged over the arched supports 20 an edge of the side flap 14 and an edge of the end flap 15 will lie adjacent each other and along the leg portion 31 of the arched support. Likewise an edge of the end flap 17 will lie along the other edge of the side flap 14 and these contiguous edges will also lie along the leg 32 of another arched support 20. The other edges of the side flap 16 will also lie along the edges of the end flaps 15 and 17.

The side edges of the screen flaps are preferably bound to finish the edge of the screen and to provide reinforcement therealong. This reinforcing and binding may be formed of suitable textile material such as canvas stitched or otherwise secured to the screen or netting. The binding material also provides means for attaching strips carrying the elements 18 of slide fasteners. The sliders or the means for causing engagement of the elements of the slide fasteners are illustrated at 19 in the drawings. Thus when the slide fasteners are closed the side flaps 14 and 16 and the end flaps 15 and 17 will form an arched canopy as shown in Fig. 1 and the detachably joined edges of the flaps will lie along and over the arched supports 20.

In erecting the device the arched resilient straps 20 are arranged in position in recesses of the socket members 21 and a mattress (not shown) of suitable dimensions may be arranged over the bottom member 23. The end flaps 15 and 17 are then arranged in the compartment closing position and to facilitate the closure of the device a plurality of hooks 22 are arranged along the marginal edges of the end flaps. These hooks 22 are adapted to engage the legs of the arched supports and maintain the end flaps 15 and 17 in position while the side flaps are being arranged in position and during manipulation of the sliders 19 to provide complete closure of the device. The hooks 22 are accordingly formed as spring clips so as to grip the supports 20 with sufficient friction to remain in attached positions on the members 20. The hooks 22 further prevent dislocation of the end flaps relative to the arched supports and inasmuch as the side flaps are joined to the edges of the end flaps the hooks 22 further maintain the arched members 20 in a position within the enclosure. The hooks 22 further maintain the end flaps 15 and 17 in position to be supported by the arched members 20 when one of the side flaps is opened. It will be apparent therefore that when the sliders 19 of the hookless fastener are moved to the position at the top of the assembly a canopy-like netting will be provided over the bottom member as shown in Fig. 1. If desired, one or more of the sliders 19 may be arranged for actuation from the interior of the compartment. The resilient characteristics of the supports 20 serve the further purpose of tensioning the flaps to draw the screening material taut. The resilient straps 20 also provide tension on the bottom member and thereby maintain its developed shape without depending upon the mattress for this purpose. Thus the device when erected may be moved from one place to another without dismantling the assembly since the entire screen netting is under tension and will not readily collapse.

The supporting arrangement for the canopy may include an intermediate arched member 20a. This arched member may likewise be formed of spring steel or any suitable resilient material and is of such a length as to curve upwardly from one side of the bottom member and lie adjacent the intersection of the arched members 20, and thereafter curve downwardly to the other side of the bottom member. A pair of sockets 21 are provided for the lower ends of the arched member 20a. These socket members are also provided with recesses within which the ends of the arched strap 20a are snugly nestled. The arched member 20a provides additional support for the side flaps 14 and 16 and further resiliently tensions the screen or netting.

The resilient arched supports 20 and 20a are shown in Figs. 1 and 2 as being formed of continuous straps for the purpose of clearly illustrating the general organization of the apparatus with reference to the screen assembly. The arch supports may be formed of relatively short sections 20b which are hinged to each other by means of a pin 24 as shown in Fig. 5. The ends of the hinge sections are provided with lugs and indentations represented generally at 25 so as to releasably maintain the sections 20b in aligned positions during use. The feature of forming the arched support of hinged sections is for the purpose of permitting these sections to be folded into a compact assembly and thereby wrapped entirely within the roll when the device is dismounted and rolled in a compact manner for storage or transportation.

When it is desired to dismantle the device, the sliders 19 are retracted to the positions at the corners of the bottom member 23 and the arched supports may then be readily removed from the sockets 21. When the arched supports are formed of hinged sections as illustrated in Fig. 5, these folded members may be arranged along the bottom member after the mattress is removed and parallel with the slats 12. The end flaps 15 and 17 may then be folded over the bottom member and the side flaps 14 and 16 may likewise be folded over the bottom member. This folding operation is facilitated when plastic screen forms the netting material. Thereafter the entire device may be rolled into a compact bundle as shown in Fig. 6 and this operation is facilitated by the arrangement of the slats 12.

A modification is illustrated in Fig. 7 wherein bounding edges of the side flaps 26 are semi-circular and the end flaps 27 and 28 have substantially parallel side edges. In this form of the invention the end flaps 27 and 28 are detachably joined to each other at the top of the compartment by hookless slide fastener assembly 30. The side edges of the end flaps are detachably joined to the curved edges of the side flaps 26 by means of slide fastener assemblies 29. The arched supports for the canopy in this form of the invention are not arranged diagonally of the bottom member but extend upwardly from one corner downwardly to the corner at the same side of the device. The supporting arrangement for the screen assembly in the modification shown in Fig. 7 may include a bar or strap (not shown) across the top under the slide fastener 30 and suitably attached to the side arched members.

It will be appreciated that the device herein shown and described provides a compartment which may be used by infants or adults from which insects, reptiles, and rodents will be excluded. The device may also be used by soldiers serving in the tropics and the device provides a compartment which may be readily dismounted and conveniently transported to remote locations for protection from disease-carrying flies and mosquitoes. While the invention has been described with reference to specific structural details, it is understood that the arrangements are capable of various modifications. It will be understood therefore that changes in the construction and arrangement of the parts and materials may be made without departing from the spirit and scope of the invention as set forth in the appended claims.

I claim:

1. A device of the character described comprising, a substantially rectangular shaped insect-proof netting bottom member, a plurality of slats arranged transversely of the bottom member at spaced intervals lengthwise thereof, end flaps of insect-proof netting and side flaps of insect-proof netting joining the bottom member, arched members extending upwardly from the corners of the bottom member and supported by said slats, and slide fasteners joining the edges of the side flaps with edges of the end flaps.

2. A device of the character described comprising, an insect-proof netting of elongated shape providing a bottom member, a flap carried by each end of the bottom member formed of insect-proof netting, a flap carried by each side of the bottom member formed of insect-proof netting, a support extending from one corner of the bottom member and arching to another corner of the bottom member, a second support extending from a third corner of the bottom member and arching to the fourth corner of the bottom member, said end flaps and side flaps terminating in edges following the arch of said supports, and slide fasteners joining the contiguous edges of the side flaps and the end flaps.

3. An insect-excluding compartment comprising, a substantially rectangular shaped bottom member formed of insect-proof netting, a plurality of slats arranged transversely of the bottom member and secured thereto at spaced intervals lengthwise thereof, flaps of insect-proof netting carried by each end portion of the bottom member, each of said flaps having arcuate shaped edges converging towards each other, flaps carried by each side of the bottom member, said side flaps each having arcuate shaped edges converging towards each other, a resilient strap supported by one of said slats at a corner of the bottom member extending upwardly therefrom and downwardly and supported by one of said slats at the other end of the bottom member and at an opposite corner thereof, a second resilient strap supported by one of the slats at the third corner of the bottom member extending upwardly therefrom and downwardly and supported by a slat at the fourth corner of the bottom member, slide fasteners joining the edges of the side flaps with the edges of the end flaps, and said fasteners extending along the resilient straps.

4. An insect and reptile excluding compartment comprising, a substantially rectangular shaped screen forming a bottom for the compartment, a support arching from one corner of the bottom to a diagonally opposite corner, a second support arching from another corner of the bottom to a diagonally opposite corner, a screen flap integral with one end of the bottom having arcuate converging edges corresponding to the curvature of said supports, a second screen flap integral with the other end of bottom having arcuate converging edges corresponding to the curvature of said supports, a third screen flap integral with one side of the bottom having arcuate converging edges corresponding to the curvature of said supports, a fourth screen flap integral with the other side of the bottom having arcuate converging edges corresponding to the curvature of said supports, and means releasably securing the edges of the end screen flaps to the edges of the side screen flaps above and along said arched supports to form a screen enclosure over the bottom.

5. An insect and reptile excluding compartment comprising, a substantially rectangular shaped screen forming a bottom for the compartment, a support arching from one corner of the bottom to a diagonally opposite corner, a second support arching from another corner of the bottom to a diagonally opposite corner, a screen flap integral with one end of the bottom having arcuate converging edges corresponding to the curvature of said supports, a second screen flap integral with the other end of bottom having arcuate converging edges corresponding to the curvature of said supports, a third screen flap integral with one side of the bottom having arcuate converging edges corresponding to the curvature of said supports, a fourth screen flap integral with the other side of the bottom having arcuate converging edges corresponding to the curvature of said supports, means releasably securing the edges of the end screen flaps to the edges of the side screen flaps above and along said arched supports to form closed screen compartment over the bottom, and hooks carried by some of said flaps engaging said supports.

6. An insect and reptile excluding compartment comprising, a substantially rectangular shaped screen forming a bottom for the compartment, a support arching from one corner of the bottom to a diagonally opposite corner, a second support arching from another corner of the bottom to a diagonally opposite corner, an end screen flap attached to the bottom screen having arcuate converging edges corresponding to the curvature of said supports, a second end screen flap attached to the bottom screen having arcuate converging edges corresponding to the curvature of said supports, a side screen flap attached to the bottom screen having arcuate converging edges corresponding to the curvature of said supports, a second side screen flap attached to the bottom screen having arcuate converging edges corresponding to the curvature of said supports, means releasably securing the edges of the end screen flaps to the edges of the side screen flaps above and along said arched supports, and a transverse arched support arranged intermediate the ends of the bottom member.

7. A protective compartment comprising, a flexible substantially rectangular shape bottom member including a plurality of transversely arranged slats spaced at intervals lengthwise of bottom member, a socket carried by said slats at each corner of the bottom member, an arched support extending from a socket at a first corner to a socket at the second end of the bottom member, another arched support extending from the socket at the other corner of the first end to the other socket at the second end of the bottom member, flexible flaps carried by the sides of said bottom member, flexible flaps carried by the ends of said bottom member, and means for detachably securing edges of the end flaps to edges of the side flaps above said arched supports.

8. An insect excluding compartment comprising, a substantially rectangular shaped screen forming a bottom for the compartment, a support arching from one corner of the bottom to a diagonally opposite corner, a second support arching from another corner of the bottom to a diagonally opposite corner, an end screen flap secured to the bottom screen having arcuate converging edges corresponding to the curvature of said supports, a second end screen flap secured to the bottom screen having arcuate converging edges corresponding to the curvature of said supports, a side screen flap secured to the bottom screen having arcuate converging edges corresponding to the curvature of said supports, a second side screen flap secured to the bottom screen having arcuate converging edges corresponding to the curvature of said supports, means releasably securing the edges of the end screen flaps to the edges of the side screen flaps above and along said arched supports, and a transverse arched support arranged intermediate the ends of the bottom member.

9. A protective compartment comprising, a flexible substantially rectangular shape bottom member including a plurality of transversely arranged slats spaced at intervals lengthwise of bottom member, a socket carried by said slats at each corner of the bottom member, an arched support extending from one of said sockets to a socket at a diagonally opposite corner of the bottom member, another arched support extending from the socket at the other corner of the first end to the other socket at the second end of the bottom member, flexible flaps joining the sides of said bottom member, flexible flaps joining at the ends of said bottom member, and means for detachably securing edges of the side flaps above said arched supports.

10. A protective compartment comprising, a rectangular shaped bottom member, a socket at each corner of the bottom member, an arched support extending from a socket at one corner of the bottom member to a socket at the second end of the bottom member, another arched support extending from the socket at the other corner of the first end of the bottom member to the other socket at the second end of the bottom member, flexible flaps attached to the ends of the bottom member, flexible flaps attached to the sides of the bottom member, and means for detachably securing edges of the end flaps to edges of the side flaps above said arched supports.

CHAUNCEY C. POTTER.

REFERENCES CITED

The following references are of record in the file of this patent:

UNITED STATES PATENTS

| Number | Name | Date |
|---|---|---|
| 659,981 | McCall | Oct. 16, 1900 |
| 720,344 | Hagedorn | Feb. 10, 1903 |
| 1,079,757 | Gould | Nov. 25, 1913 |
| 1,608,242 | Sava | Nov. 23, 1926 |
| 2,168,913 | Middleton | Aug. 8, 1939 |